United States Patent [19]
Hedlund

[11] Patent Number: 5,288,180
[45] Date of Patent: Feb. 22, 1994

[54] CUTTING TOOL

[75] Inventor: Thomas Hedlund, Gästrike-Hammarby, Sweden

[73] Assignee: Sandvik AB, Sandviken, Sweden

[21] Appl. No.: 921,942

[22] Filed: Jul. 30, 1992

[30] Foreign Application Priority Data

Jul. 31, 1991 [SE] Sweden .................... 9102262-4

[51] Int. Cl.⁵ .................... B23B 27/08; B23B 27/04
[52] U.S. Cl. .................... 407/101; 407/110; 407/117; 82/161
[58] Field of Search .................... 407/101, 102, 107, 109, 407/110, 117; 82/158, 101

[56] References Cited

U.S. PATENT DOCUMENTS

| | | | |
|---|---|---|---|
| 3,316,617 | 5/1967 | Stein | 407/117 |
| 3,611,525 | 10/1971 | Cochran | 407/117 |
| 3,844,008 | 10/1974 | Sletten | 407/110 |
| 4,035,889 | 7/1977 | McCreery | 407/117 |
| 4,118,138 | 10/1978 | Takacs et al. | 407/117 |
| 4,227,838 | 10/1980 | Berry | 407/117 |
| 4,247,231 | 1/1981 | Kraemer | 407/101 |
| 4,288,184 | 9/1981 | Veigel | 407/101 |
| 5,112,163 | 5/1992 | Veilleux | 407/101 |
| 5,112,164 | 5/1992 | Pano | 407/110 |
| 5,150,992 | 9/1992 | Friedmann | 407/117 |

FOREIGN PATENT DOCUMENTS

| | | |
|---|---|---|
| 3442102 | 6/1986 | Fed. Rep. of Germany . |
| 3819415 | 12/1989 | Fed. Rep. of Germany . |
| 4028361 | 3/1991 | Fed. Rep. of Germany . |

*Primary Examiner*—William E. Terrell
*Attorney, Agent, or Firm*—Burns, Doane, Swecker & Mathis

[57] ABSTRACT

A cutting tool for parting and grooving operations comprises a shaft and a clamp body releasably secured to the front end of the shaft. The clamp body carries a cutting insert clamped between a pair of clamp arms. The clamp body includes first and second blade portions oriented at a right angle to one another. The first blade portion is adapted to be secured to one outer surface of the shaft, whereas the second blade portion is adapted to be secured to a second outer surface of the shaft.

10 Claims, 3 Drawing Sheets

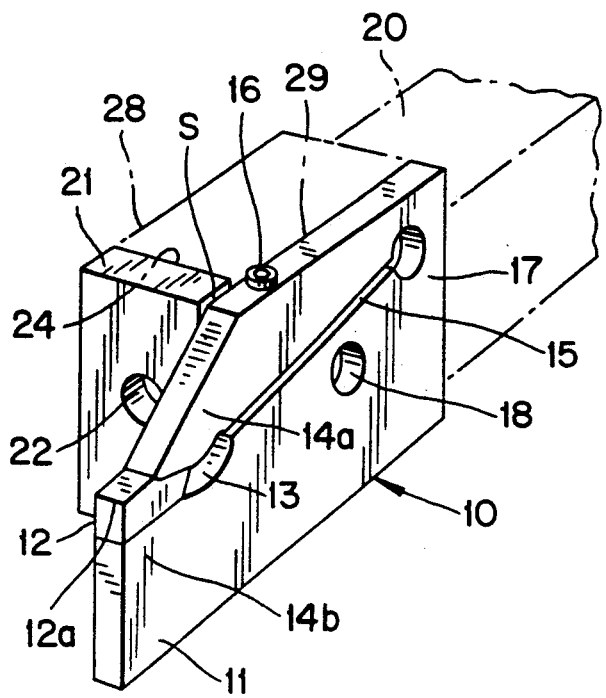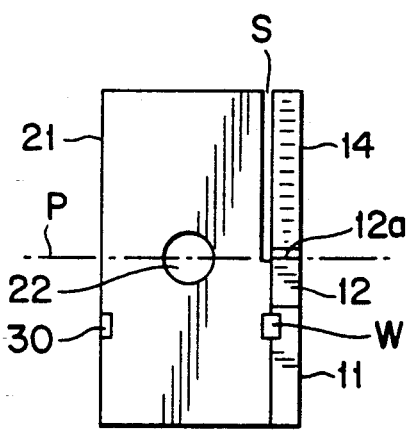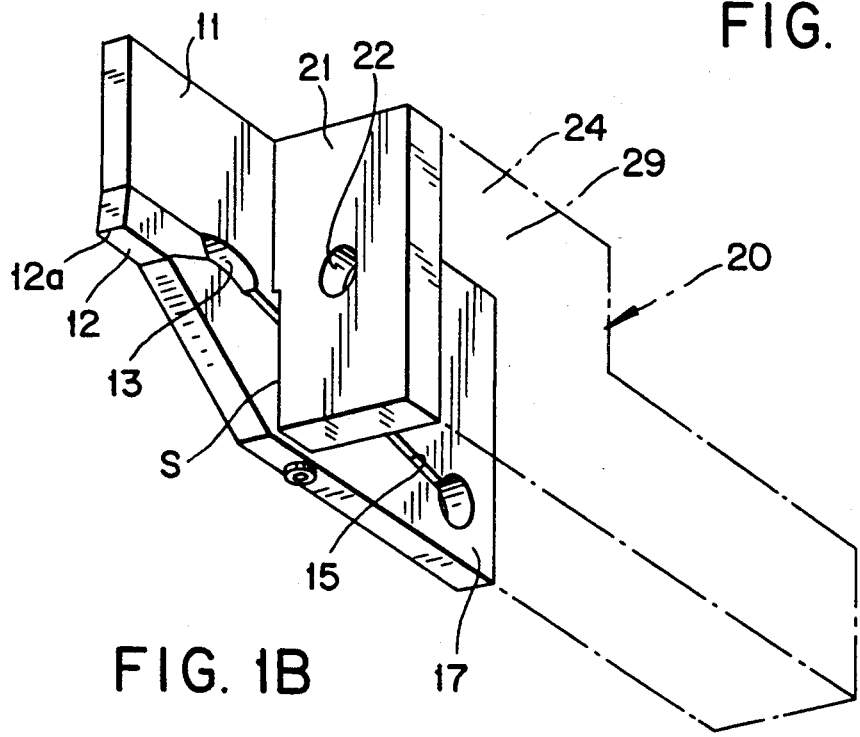

5,288,180

CUTTING TOOL

BACKGROUND OF THE INVENTION

The present invention relates to a tool for chip forming machining of metal workpieces specifically for grooving and parting operations. The tool comprises a clamp with an insert and a releasable holder shaft attached thereto. The clamp comprises a securing portion mating with the shaft and an extension portion.

A large number of tools for grooving and parting are previously known where the tool comprises a shaft and an insert-provided clamp attached thereto, which clamp is secured to the holder shaft. Sletten U.S. Pat. No. 3,844,008 discloses a tool which comprises an insert-carrying clamp body in the shape of a blade attached against one side surface of a holder shaft by means of a clamping screw. The screw is received in a hole that extends transversely through the clamp body and is threadedly engaged in a threaded hole in the holder shaft. In order to achieve a good location and good stability, the blade-like clamp is additionally provided with an extension at one of its side surfaces which is received in a complementary shaped lateral recess in the holder shaft. Further, the holder shaft also has a corresponding lateral recess on its opposite side surface. This enables the same holder shaft to be equipped with a clamp for either right or left hand turning.

However, it will be necessary to use separate clamps having the extensions provided on the appropriate side thereof.

It turns out, however, that such a tool does not always give the desirable maximum stability during machining of materials with difficult or average machinability properties. Further, it is desirable to be able to use a holder system designed so it enables machining the workpiece in two directions oriented perpendicular to one another without having to use different tools for each operation.

SUMMARY OF PREFERRED EMBODIMENTS OF THE INVENTION

The present invention relates to a new type of tool which eliminates the above-mentioned and other problems and which also provides a high degree of versatility. At the same time, it will be possible to facilitate and produce such tools at lower costs due to its simple construction.

A significant feature of this new tool is that it comprises a first blade portion and a second blade portion oriented perpendicularly from the first blade portion. According to one embodiment, one preferred mounting screw is threadably engaged in the holder shaft for the purpose of securing the first blade portion and another screw is used for similarly securing the second blade portion to the shaft in a direction perpendicularly to the direction of the first screw.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 1 is a perspective view of an insert-carrying clamp body secured to a holder shaft in accordance with a first embodiment of the invention;

FIG. 1A is a front elevational view of the tool depicted in FIG. 1;

FIG. 1B is a perspective view of the tool of FIG. 1 after the clamp body has been removed from the shaft, inverted, and positioned on the opposite side of the shaft;

DETAILED DESCRIPTION OF PREFERRED EMBODIMENTS OF THE INVENTION

Figure 2:
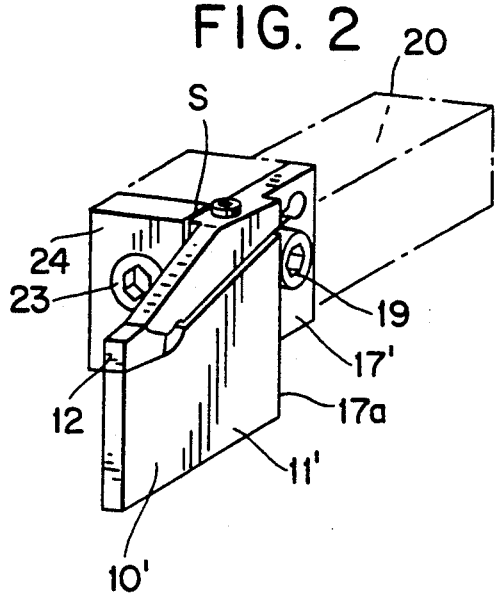
FIG. 2 is a perspective view of a second embodiment of an insert-carrying clamp body according to the invention.

In FIGS. 1 and 1A, a clamp body 10 comprises a forwardly extending first blade portion 11, so-called because it is in the shape of a thin plate. The first blade portion 11 carries a cutting insert 12 with a cutting edge 12a for parting and grooving operations. The insert 12 is in this embodiment received in a recess 13 at the forward end of the blade portion 11. The clamp force exerted on the insert 12 is provided by an upper clamp arm 14a which is made integral with the blade portion 11 by a slot 15 formed therein. The clamp arm is activated by tightening a clamp screw 16 Which extends downwards through the slot 15 and into a lower clamp arm 14b of the blade portion 11. A rear end 17 of the blade portion 11 extends rearwardly and integrally from and in the same plane as the clamp arms 14a, 14b. The rear end 17 is provided with a laterally extending bore 18 which extends entirely through the blade portion 11 for the receipt of a complementary mounting screw (similar to screw 19 shown in FIG. 2) intended to be threadably engaged in a hole 27 of a holder shaft 20 (see FIG. 4).

The clamp body 10 is provided with a second blade shaped portion 21 functioning as a mounting portion while oriented perpendicularly from the first blade shaped clamp portion 11. The second blade portion 21 is of integral one-piece construction with the first blade portion 1. A slit S is formed between upper sections of the first and second blade portions 11, 21 to permit the upper clamp arm 14a to be deflected downwardly toward the second clamp arm 14b. That is, the second blade portion 21 is connected with the first blade portion 11 only at a location below the slot 15. In order to firmly secure the second blade portion 21 to the holder shaft 20, the second blade portion is provided with a hole that extends entirely therethrough for the receipt of a mounting screw 23 (similar to the screw 23 of FIG. 2) which is to be threadably engaged into a corresponding bore 25 of the front surface 24 of the holder shaft.

The holder shaft 20 is preferably designed in such manner that the center line $Cl_1$ of the bore 25 (which extends through an outer transverse surface 24 in the axial direction of the shaft 20) is oriented in the same horizontal plane P (see FIG. 1A) as the center line $Cl_2$ of the bore 27 that extends through outer side surfaces 28, 29 of the shaft and perpendicularly to the bore 25.

Also, the cutting edge 12a is preferably oriented in that same horizontal plane with the center lines Cl₁ and Cl₂. The side surfaces 28, 29 are oriented parallel to a longitudinal axis L of the shaft and the transverse surface 24 is perpendicular to that axis L.

Figure 4:
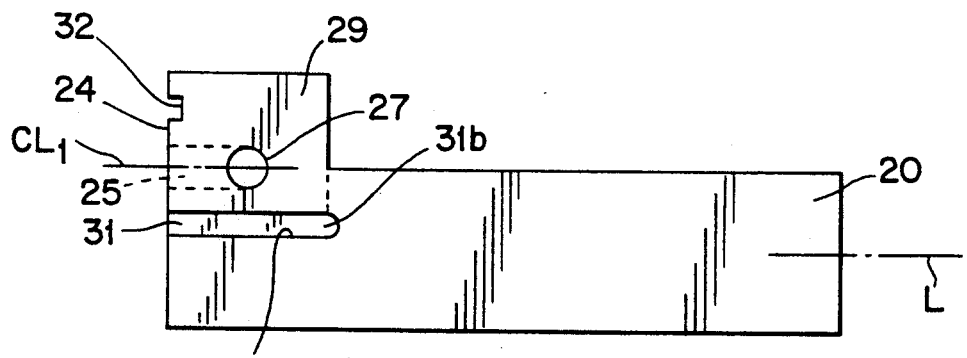
FIG. 4 is a side elevational view of the elongated holder shaft depicted in phantom in FIGS. 1, 1B and 2.
Figure 5:
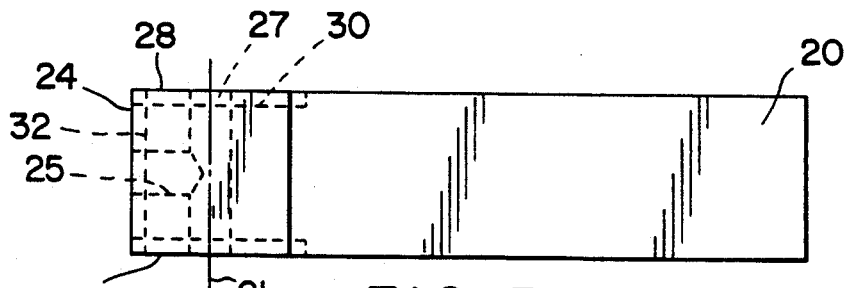
FIG. 5 is a plan view of the holder shaft shown in FIG. 4.

As shown in FIGS. 4–5, the transversely extending bore 27 of the holder shaft 20 extends entirely through a front head portion 20a of the shaft and terminates in two opposed parallel side surfaces 28 and 29. This enables the same holder shaft to be used for both right and left hand turning. The side surfaces 28 and 29 are coplanar with the remaining rearwardly extending sides of the holder shaft 20. Elongated recesses 30 and 31 are provided in the side surfaces 28, 29, respectively, and in the axial direction of the shaft. Those recesses are intended to receive positioning and stabilizing wedge elements W (see FIG. IA). Each of the recesses 30, 31 is open longitudinally forwardly and laterally outwardly and includes perpendicularly oriented surfaces 31a, 31b. A further such recess 32 is also provided in the front surface of the shaft 20 (see FIG. 4). The body 10 would be provided with complementary recesses such that the wedge element is received partly in the shaft 20 and partly in the body 10.

A great deal of versatility is achieved with such a tool. Due to its square or rectangular shape in cross section the manufacture can be made simpler and cheaper. The recess 27 for the screw 19 can be straight and made to extend entirely through the shaft 20. This enables the same holder and clamp body 10 to be used for machining a workpiece in a normal position as shown in FIG. 1 or to use the same tool in an upside down position as depicted in FIG. 1B. In FIG. 1B, the clamp body 10 has been detached from the shaft 20, rotated by 180° about the axis of hole 25, and then reattached to the shaft. This is accomplished while keeping the cutting edge 12a at the same elevation, i.e., the cutting edge remains in the plane P which includes the centers of the bores 25 and 27.

In the FIG. 1B arrangement, the first blade portion 11 (which previously engaged the outer side surface 29 of the shaft 20) engages the outer side surface 28 (which lies parallel to surface 29), while the second blade portion 21 still engages the transverse outer surface 24.

When making light cuts, only the mounting screws 19 and 23 are needed to secure the body 10 to the shaft 20. For heavier cutting and large slotting depths, such mounting should additionally also include the usage of a positioning element or wedge W located in the elongated recess 30 or 31 or 32 (see FIG. 1A).

FIG. 2 depicts an alternative arrangement which is similar to that of FIG. 1, but wherein the rear end 17' of the first blade portion 11' is stepped inwardly at 17a relative to the front section of the first blade portion 11'. Such an arrangement provides for better accessibility in certain operations.

Figure 3:
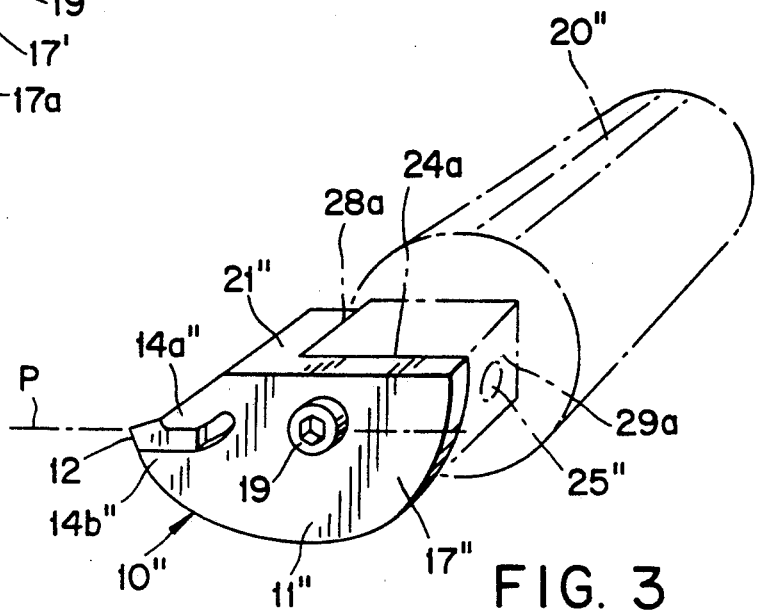
FIG. 3 is a perspective view of a third embodiment of an insert-carrying clamp body secured to a holder shaft according to the invention.

Another alternative embodiment of the invention show in FIG. 3 involves a boring bar 20" for internal turning in a workpiece (not shown). In this embodiment, a mounting screw 19 is securing the first blade portion 11" against a forward transverse outer end surface 24a of the generally cylindrical boring bar shaft 20, whereas the second blade portion 21" is releasably secured against one outer side surface 28a of the boring bar 20". The lower edge of the first blade portion 11" has been circularly shaped in order to facilitate the machining of a circular hole of the workpiece 14a, 14b.

The second blade portion 21" is secured to shaft 20" by a screw (not shown) which extends into a throughhole 25" in the outer side surfaces 28a, 29a of the shaft. That hole 25" extends completely through the shaft 20" and thus enables the body 10" to be reversed by mounting the second blade portion 21" against the side surface 29a of the shaft. Alternatively, the body 10" can be adjusted by 90° by attaching the first blade portion 11" to one of the side surfaces 28, 29, and attaching the second blade portion 21" to the transverse surface 24a.

The insert 12 can be clamped by means of a clamping screw (not shown) similar to the clamping screw 16 of FIG. 1, or by the inherent elasticity of the clamping arms 14a", 14b". Note that the clamping arms 14a", 14b" are relatively shorter than those of FIGS. 1 and 2 to facilitate a usage of the body 10" in the position depicted in FIG. 3, i.e., for use in boring through a workpiece.

Figure 6:
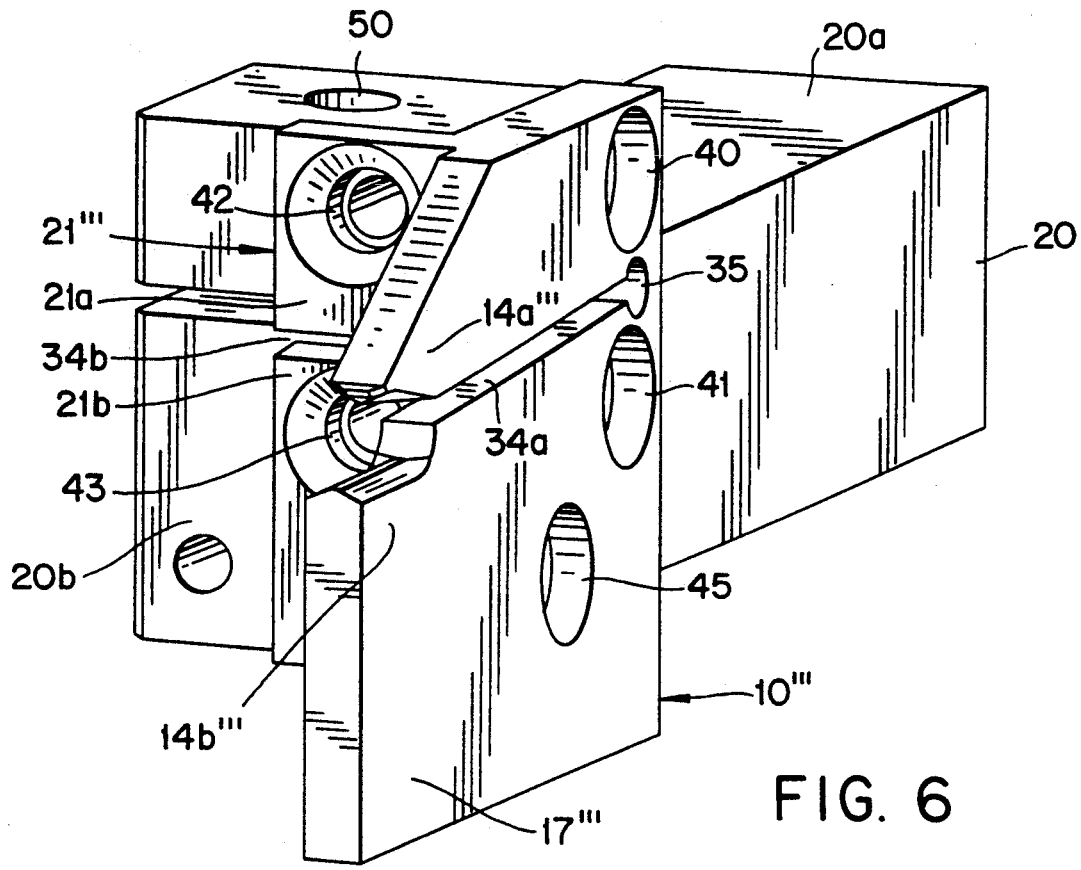
FIG. 6 is a perspective view of a fourth embodiment of the tool and shaft according to the invention.
Figure 7:
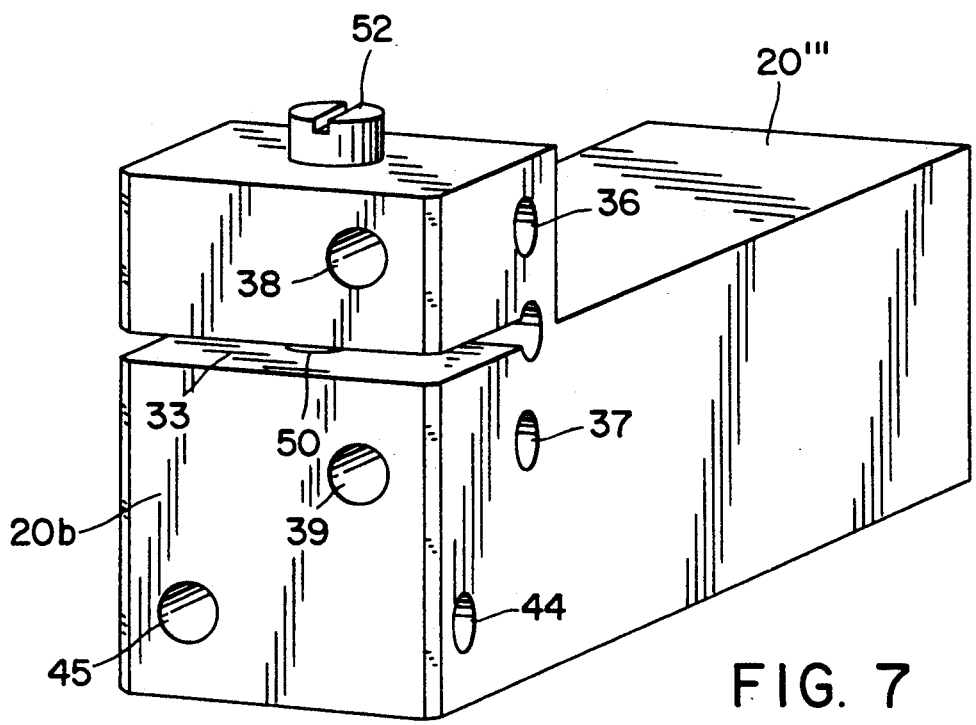
FIG. 7 is a perspective view of the holder shaft shown in FIG. 6.

In an alternative tool embodiment shown in FIGS. 6–7, the front portion of the holder shaft 20''' is provided with a slot 33 that extends in the same plane as an upper surface 20a of the shaft. The clamp body 10 is, similar to the embodiments of FIGS. 1–5, provided with first and second blade-shaped portion 11''' and 21'''. The first blade portion 11''' includes a slot 34a, which is terminated by a round recess 35 in the rear portion of the first blade portion. The diameter of the recess 35 is larger than the width of the slot 34a. The second blade portion 21''' is also provided with a corresponding slot 34b. The slot 34b is contiguous with the slot 34a and thus divides the second blade portion 21''' into upper and lower parts 21a, 21b which project perpendicularly from the first blade portion 11'''. The forward portion of the holder shaft 20''' is, similar to FIG. 2, in the shape of a rectangle. Transverse bores 36 and 37 are provided in that forward portion one on each side of the slot 33. Further, two longitudinal threaded bores 38 and 39 are provided in the front surface 24b of the shaft 20''' while being perpendicular and coplanar in relation to the bores 36 and 37, respectively. The clamp body 10''' is provided with correspondingly provided bores 40, 41 and 42, 43, respectively. In order to further improve the mounting stability of the body 10''', a further threaded bore 44 is provided in the lower portion of the shaft to be aligned with a corresponding bore 45 in the forward blade shaped clamp portion 17.

The front portion of the shaft 20''' is provided with a vertical threaded hole 50 which extends perpendicular to the common planes of holes 36–38; 37–39; and 44–45. That hole 50 is adapted to receive a screw 52. By tightening the screw 52, the upper and lower parts 21a''', 21b''' (and thus also the clamping arms 14a''', 14b''') are moved together to clamp an insert (not shown).

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A cutting tool for grooving and parting chip cutting operations on metal workpieces, comprising a holder shaft and a clamp body removably attached thereto, said clamp body including clamping jaws for retaining a cutting insert, said clamp body including integral first and second blade portions, said first blade portion being attached to one outer surface of said shaft by a first removable fastener, said second blade portion extending perpendicular to said first blade portion at a location spaced from opposite ends of said first blade portion, said second blade portion being attached to another outer surface of said shaft by a second removable fastener, said clamping jaws being formed in said first blade portion and defining a slot which is open at one end thereof, said other outer surface facing in the same direction as said open end of said slot.

2. A cutting tool according to claim 1, wherein said shaft includes a plurality of outer side surfaces extending parallel to a longitudinal axis of said shaft, and an outer transverse surface extending perpendicular to said axis.

3. A cutting tool according to claim 2, wherein said outer side surfaces contain longitudinally extending recesses which are open forwardly and transversely outwardly.

4. A cutting tool according to claim 1, wherein said first and second fasteners define respective axes laying in a common plane which also contains a cutting edge of said cutting insert.

5. A cutting tool according to claim 4, wherein said first and second fasteners comprise screw-threaded fasteners.

6. A cutting tool according to claim 1, wherein said first blade portion includes a side surface facing away from said shaft and being stepped intermediate its front and rear ends to form a shoulder.

7. A cutting tool according to claim 1, wherein mutually facing surfaces of said clamp body and said shaft include recesses in which a stabilizing element is fitted.

8. A cutting tool according to claim 1, wherein said clamp body includes a slot 15 extending generally longitudinally to form a pair of clamp arms on opposite sides of said slot, said second blade portion being joined to said first blade portion on only one side of said slot.

9. A cutting tool according to claim 1, wherein said clamp body includes a first slot 15 extending generally longitudinally to form a pair of clamp arms on opposite sides of said slot for retaining a cutting insert, said second blade portion including a second slot contiguous with said first slot to divide said second blade portion into first and second parts joined respectively with first and second parts of said first blade portion located on opposite sides of said first slot.

10. A cutting tool according to claim 9, wherein said shaft includes a third slot arranged to be coplanar with said first and second slots to divide said second outer surface into first and second parts connected respectively to said first and second parts of said second blade portion, and a clamping screw disposed in said shaft and extending across aid third slot for moving said clamp arms together.

* * * * *